(12) United States Patent
Toler

(10) Patent No.: US 10,672,166 B2
(45) Date of Patent: Jun. 2, 2020

(54) SYSTEMS AND METHODS FOR PROVIDING A VIRTUAL AIRCRAFT BUILD PROCESS

(71) Applicant: Gulfstream Aerospace Corporation, Savannah, GA (US)

(72) Inventor: Brian Toler, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 77 days.

(21) Appl. No.: 15/952,759

(22) Filed: Apr. 13, 2018

(65) Prior Publication Data

US 2018/0300920 A1    Oct. 18, 2018

Related U.S. Application Data

(60) Provisional application No. 62/485,816, filed on Apr. 14, 2017.

(51) Int. Cl.
| | |
|---|---|
| *G06T 11/60* | (2006.01) |
| *G06T 3/40* | (2006.01) |
| *G06F 3/0482* | (2013.01) |
| *G09B 5/02* | (2006.01) |
| *G09B 19/00* | (2006.01) |
| *G06F 3/01* | (2006.01) |
| *G06T 11/00* | (2006.01) |

(52) U.S. Cl.
CPC .............. *G06T 11/60* (2013.01); *G06F 3/011* (2013.01); *G06F 3/0482* (2013.01); *G06T 3/4038* (2013.01); *G06T 11/00* (2013.01); *G09B 5/02* (2013.01); *G09B 19/00* (2013.01); *G06T 2200/24* (2013.01); *G06T 2200/32* (2013.01); *G06T 2210/04* (2013.01)

(58) Field of Classification Search
CPC ..... G06F 3/0482; G06T 11/60; G06T 3/4038; G09B 19/00; G09B 5/02
See application file for complete search history.

(56) References Cited

U.S. PATENT DOCUMENTS

| | | | | |
|---|---|---|---|---|
| 6,487,479 | B1 * | 11/2002 | Nelson ................. | G06Q 10/087 701/29.1 |
| 8,022,843 | B2 * | 9/2011 | Mitchell ................ | H01Q 1/007 340/945 |
| 8,249,909 | B2 * | 8/2012 | Watanabe ........... | G06F 17/5004 705/7.23 |

(Continued)

OTHER PUBLICATIONS

German Patent and Trademark Office. Search Report for Application No. 10 2018 108 748.9, dated Nov. 22, 2018.

(Continued)

*Primary Examiner* — Daeho D Song
(74) *Attorney, Agent, or Firm* — LKGlobal | Lorenz & Kopf, LLP

(57) ABSTRACT

Systems and methods are provided for displaying multiple aircraft states of an aircraft build process. A method includes storing, in a computer storage device, visual depictions of the multiple aircraft states that are layered over one another. The multiple build states of an aircraft represent different operational states of the aircraft over time. A user interface is configurable to display aircraft build states that occur during an aircraft build process based upon retrieval of the particular build phase from the computer storage device.

20 Claims, 6 Drawing Sheets

(56) References Cited

U.S. PATENT DOCUMENTS

| | | | | |
|---|---|---|---|---|
| 8,620,708 | B2* | 12/2013 | Miyake | G06Q 10/063114 705/7.15 |
| 8,996,151 | B2* | 3/2015 | Bouffiou | G05B 19/41805 700/107 |
| 9,110,560 | B1* | 8/2015 | Senesac | G06F 3/0481 |
| 9,292,180 | B2* | 3/2016 | Gass | G06F 3/0484 |
| 9,412,203 | B1* | 8/2016 | Garcia, III | G06T 19/006 |
| 9,607,370 | B2* | 3/2017 | Freeman | G06T 7/001 |
| 9,792,573 | B2* | 10/2017 | Furbeck | G06Q 10/067 |
| 10,379,524 | B2* | 8/2019 | Senesac | G06F 3/0481 |
| 2003/0083794 | A1* | 5/2003 | Halm | B64D 47/00 701/29.4 |
| 2003/0098798 | A1* | 5/2003 | Kato | G05B 23/0272 340/679 |
| 2004/0069731 | A1* | 4/2004 | Hovik | B65G 1/127 211/121 |
| 2006/0044307 | A1* | 3/2006 | Song | G06Q 10/06 345/419 |
| 2006/0226285 | A1* | 10/2006 | Matsui | B64C 13/42 244/99.6 |
| 2008/0094313 | A1* | 4/2008 | Simon | B60K 35/00 345/7 |
| 2009/0216804 | A1* | 8/2009 | Kersavage | G06Q 10/04 |
| 2011/0256000 | A1* | 10/2011 | Fukui | F04B 49/002 417/213 |
| 2012/0260180 | A1* | 10/2012 | Herzberg | G05B 23/0221 715/736 |
| 2013/0155058 | A1* | 6/2013 | Golparvar-Fard | G06T 19/006 345/419 |
| 2013/0304426 | A1* | 11/2013 | Sciarra | G06F 17/509 703/1 |
| 2014/0152651 | A1* | 6/2014 | Chen | G06T 19/003 345/419 |
| 2014/0156047 | A1* | 6/2014 | Song | G05B 19/41865 700/95 |
| 2014/0259596 | A1* | 9/2014 | Senesac | G06Q 50/04 29/407.1 |
| 2014/0282183 | A1* | 9/2014 | Senesac | B64F 5/10 715/771 |
| 2014/0309969 | A1* | 10/2014 | Senesac | G06Q 10/0631 703/1 |
| 2014/0310629 | A1* | 10/2014 | Senesac | G06Q 10/06 715/771 |
| 2014/0337777 | A1* | 11/2014 | Senesac | G06F 3/0481 715/771 |
| 2014/0365943 | A1* | 12/2014 | Senesac | G06Q 50/28 715/771 |
| 2014/0380215 | A1* | 12/2014 | Senesac | B64F 5/10 715/771 |
| 2015/0268469 | A1* | 9/2015 | Marsh | G02B 27/017 345/8 |
| 2015/0310135 | A1* | 10/2015 | Forsyth | G06F 17/5004 703/1 |
| 2016/0048631 | A1* | 2/2016 | Campos | G06F 17/509 703/1 |
| 2016/0085426 | A1* | 3/2016 | Scott | G09G 5/377 715/708 |
| 2016/0252898 | A1* | 9/2016 | Sahadeo | G05B 19/4183 700/116 |
| 2018/0018764 | A1* | 1/2018 | Glatfelter | G05B 19/41805 |

OTHER PUBLICATIONS

Garcia, Marisa. Google Street View Comes to Planes With SAS's Interactive Tours, Apr. 2018 [online], [retrieved on Nov. 20, 2018]. Retrieved from the Internet: <URL:https://skift.com/2015/04/08/sas-raises-stakes-on-augmented-reality-marketing-with-interactive-google-street-view-of-aircraft-cabin/>.

Karsch, K., et al. ConstructAide: Analyzing and Visualizing Construction Sites through Photographs and Building Models. ACM Transactions on Graphics (TOG), Nov. 2014, vol. 33, pp. 1-11, Article No. 176 [serialonline], [retrieved on Nov. 20, 2018]. Retrieved from the Internet <URL: https://dl.acm.org/citation.cfm?doid=2661229.2661256>.

Szeliski, Richard. Image Alignment and Stitching: A Tutorial, Dec. 2006, Technical Report MSR-TR-2004-92, pp. 1-89 [serialonline], [retrieved on Nov. 20, 2018]. Retrieved form the Internet <URL: https://www.microsoft.com/en-us/research/wp-content/uploads/2004/10/tr-2004-92.pdf>.

Lego City Passenger Airplane Construction Manual, Product No. 7893, The Lego Group, 2006 [online], [retrieved on Nov. 20, 2018]. Retrieved from the Internet: <URL: www.lego.com/biassets/bi/4493624.pdf>.

* cited by examiner

_US 10,672,166 B2_

SYSTEMS AND METHODS FOR PROVIDING A VIRTUAL AIRCRAFT BUILD PROCESS

CROSS-REFERENCE TO RELATED APPLICATION

This application claims the benefit of and priority to U.S. Provisional Application No. 62/485,816 filed on Apr. 14, 2017 and entitled "Systems and Methods for Providing a Virtual Aircraft Build Process," whose disclosure is incorporated by reference herein for all purposes.

TECHNICAL FIELD

The technical field generally relates to an aircraft build process, and more particularly relates to providing a virtualized environment for the aircraft build process for users.

SUMMARY

In accordance with the teachings provided herein, systems, methods, apparatuses, non-transitory computer-readable medium for operation upon one or more data processing devices are provided for displaying multiple aircraft states of an aircraft build process. A method and system includes storing, in a computer storage device, visual depictions of the multiple aircraft states that are layered over one another. The multiple build states of an aircraft represent different operational states of the aircraft over time. The visual depictions are associated with operational state data to indicate the operational phase to which a visual depiction is related. One or more data processors are configured to provide a user interface for display to a user. The user interface is configurable to display aircraft build states as layers that correspond to a chronological order of the aircraft state during the aircraft build process.

BREIF DESCRIPTION OF THE DRAWINGS

The present invention will hereinafter be described in conjunction with the following drawing figures, wherein like numerals denote like elements, and FIG. 1 depicts a computer display of a virtual aircraft that is made by photographing multiple build states of an airraft;

DESCRIPTION

Figure 1:
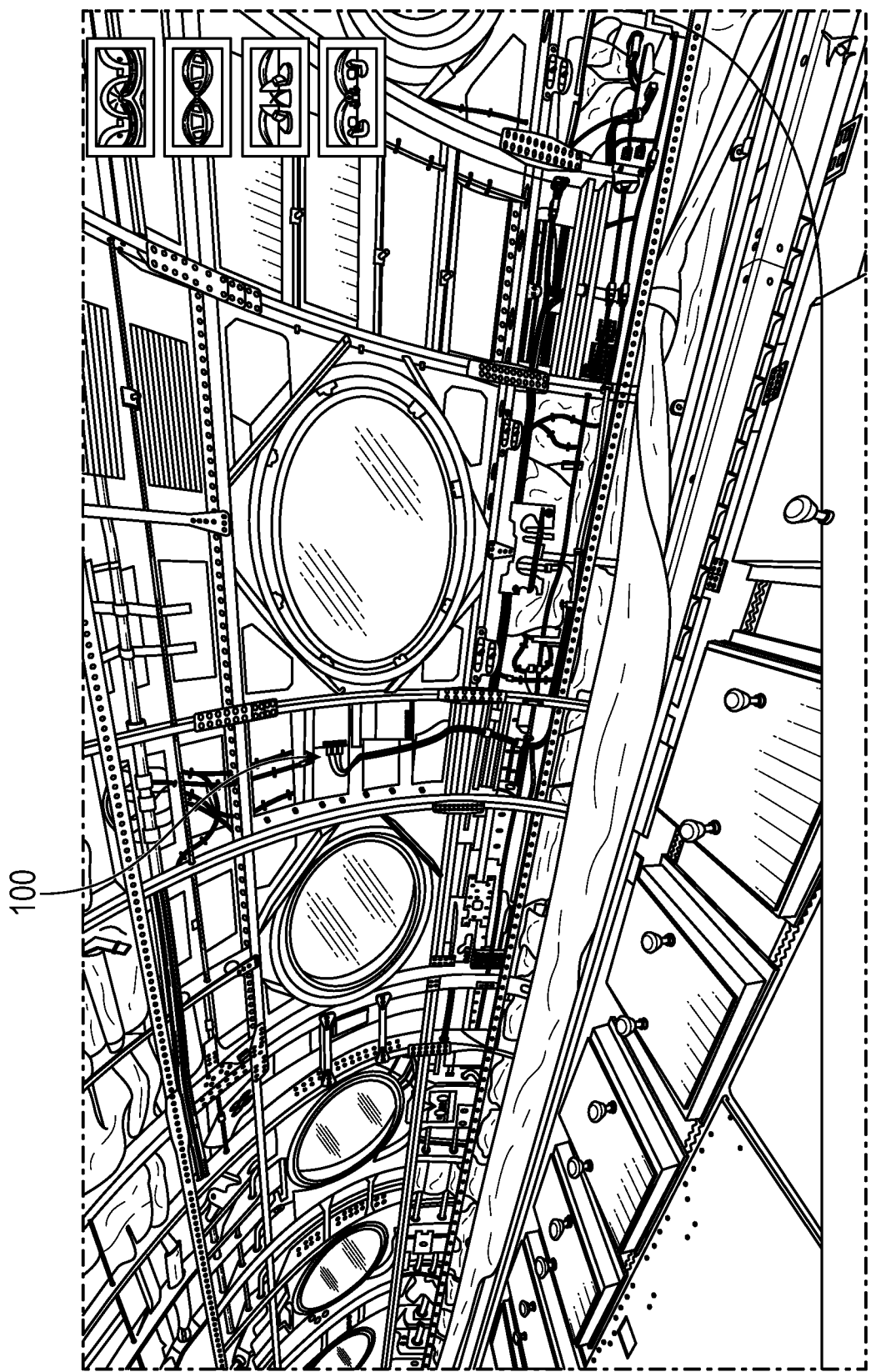

FIG. 1 depicts at 100 a virtual aircraft that is made by photographing multiple build states of an aircraft (e.g., a Gulfstream aircraft). Using a camera and a wide-angle lens, multiple photographs of the aircraft are taken. The photos are transferred and then edits and any needed adjustments are done. The photos are stitched together using a software program called PTGui from New House Internet Services BV, in The Netherlands. PTGui is panoramic image stitching software for Windows and Mac OS X for creating fully spherical 360°×180° panoramas. PTGui includes interactive panorama viewers both for local viewing on a computer, and for embedding in a web page.

The photos are added to a software program called Panotour pro by Kolor/Gopro. In that program, the layers, callouts and other interactive materials are created such as detailed views of the access panels, APU, empennage, and engines. The callouts allow the user to identify components on the aircraft, such as shown at 102 in FIG. 1 with the "GCMS Controller."

The product is exported and viewed by the user (customer/gulfstream employee) on a tablet or desktop browser. The virtual aircraft process, display, and user manipulation provides panoramic 360 images and 360 tours and captures the multiple states of the build process by layering them over one another, such as shown at 104 in FIG. 1. Many different types of users can access the virtual aircraft system for different purposes. For example, users who wish to learn or be trained in construction of an aircraft can course through the panoramic 360 images and 360 tours of an aircraft from the start of the build process to its completion without ever stepping into a real aircraft. Such users also do not have to wait to see each phase of the build process until it is completed.

Figure 2:
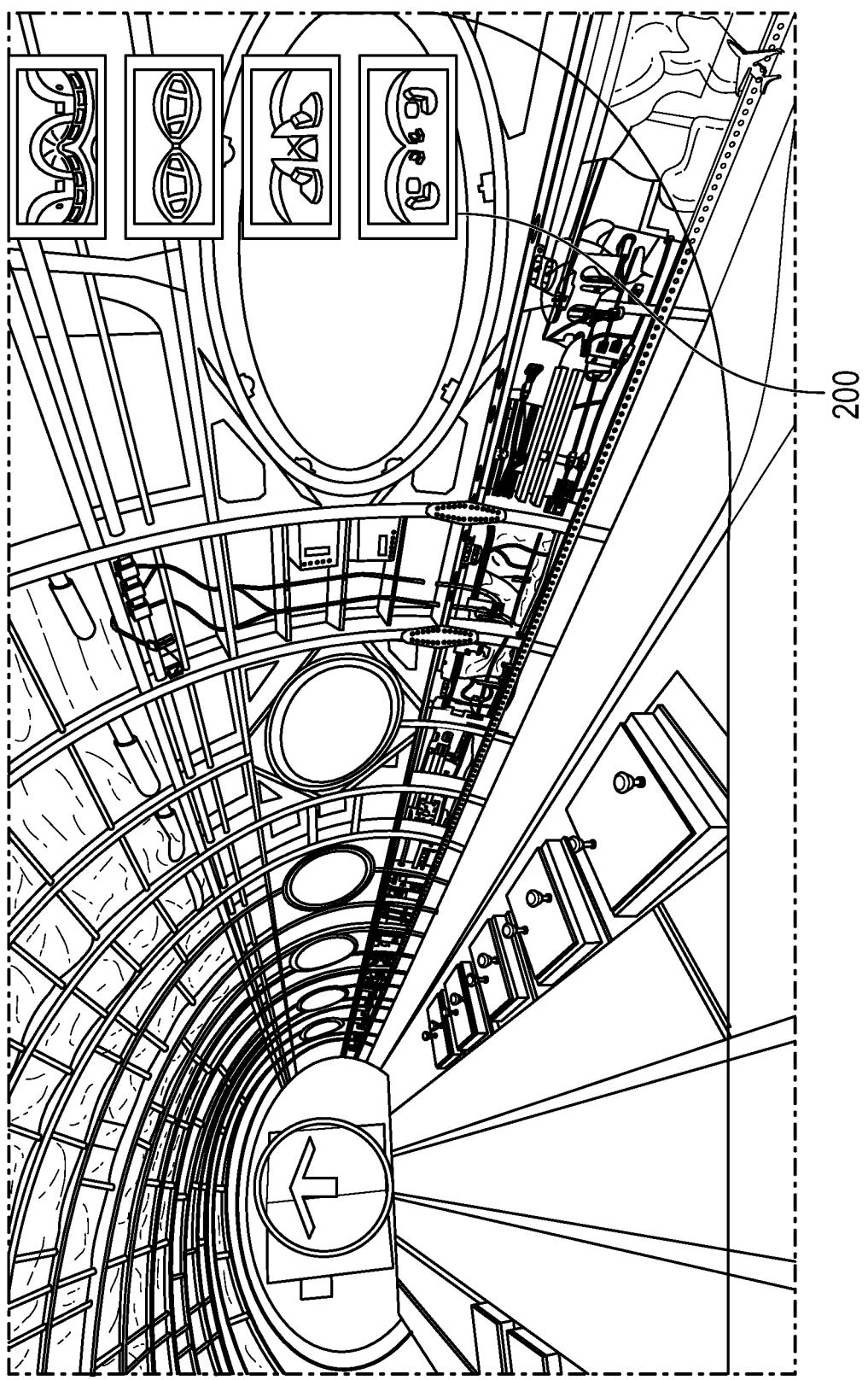
FIG. 2 depicts a computer display of a maintenence view of a virtual aircraft.
Figure 3:
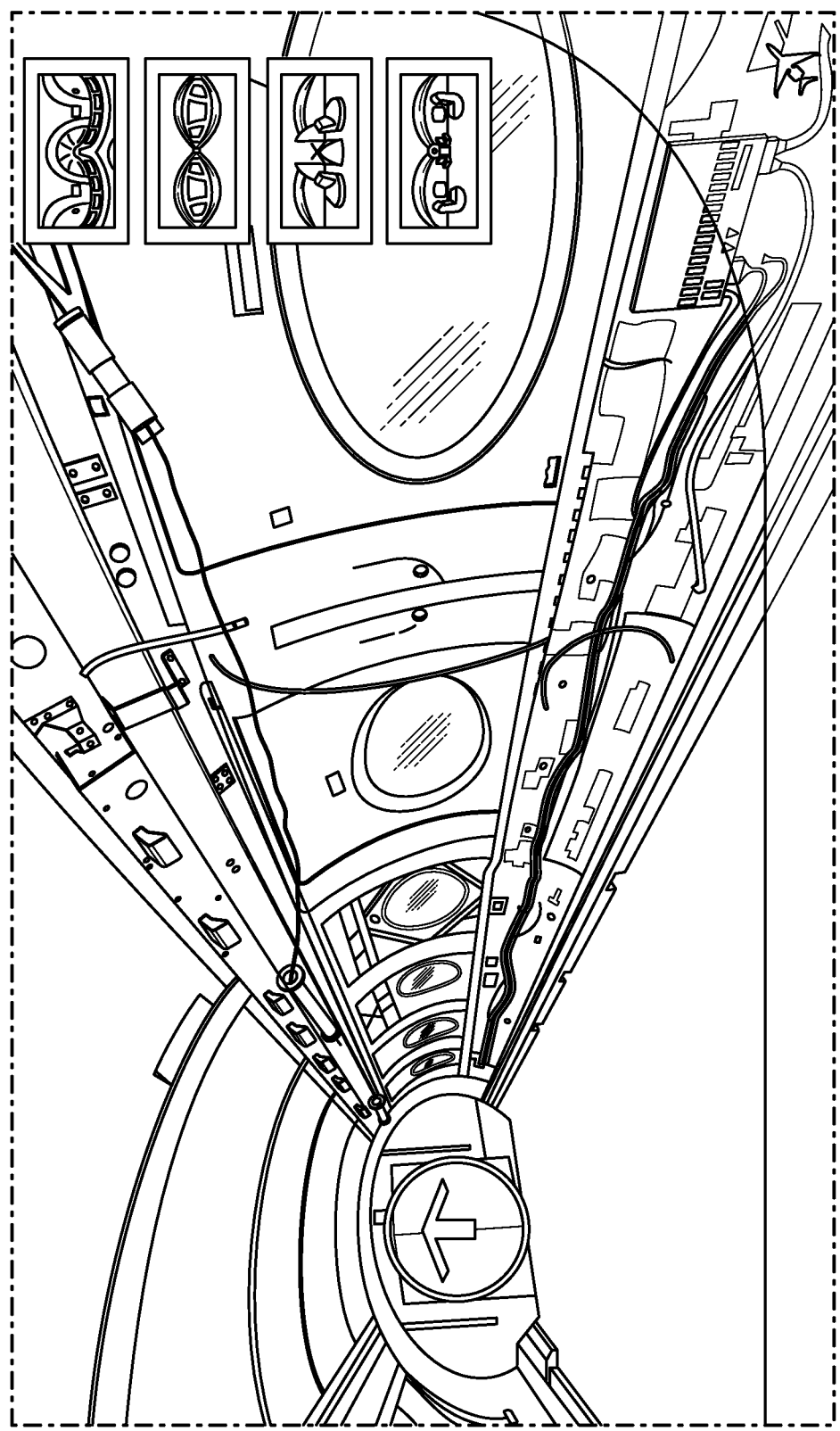
FIG. 3 depicts a computer display of an advanced test view of a virtual aircraft.
Figure 4:
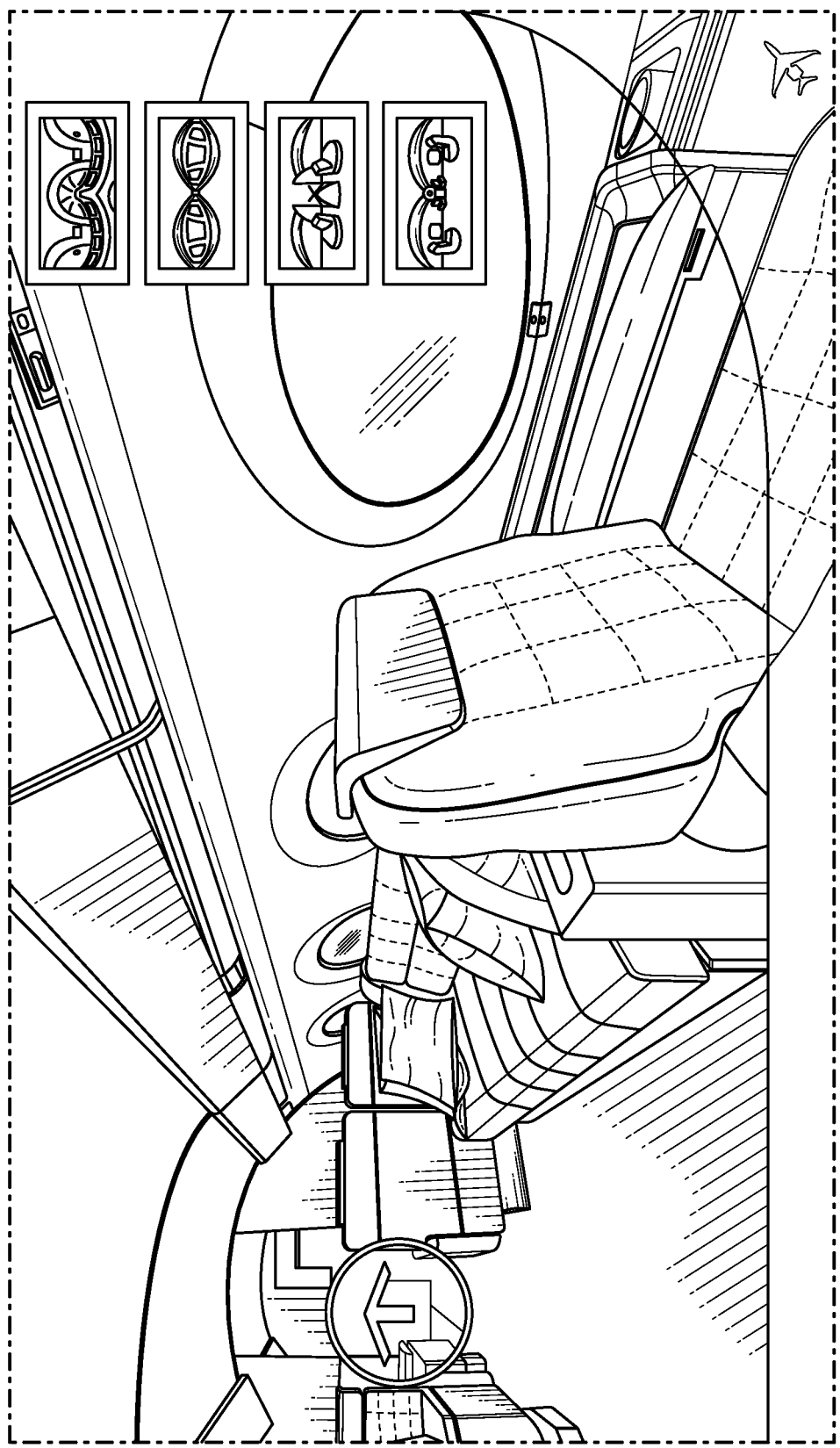
FIG. 4 depicts a computer display of a completed aircraft view of a virtual aircraft.

FIGS. 2-4 illustrate a user going from a maintenance view to an advanced test view to a completed aircraft view. In this example, the view among the figures is the same but captured at different points in the build process.

FIG. 2 depicts a maintenance view at 200. The maintenance view shows, for example, the structure, wire runs, and components of an aircraft. A user can go to other views by clicking on the miniature windows as shown at 202 in FIG. 2.

FIG. 3 depicts an advanced test view at 300. The advanced test view shows the additional wire runs and structure build up.

Figure 5:
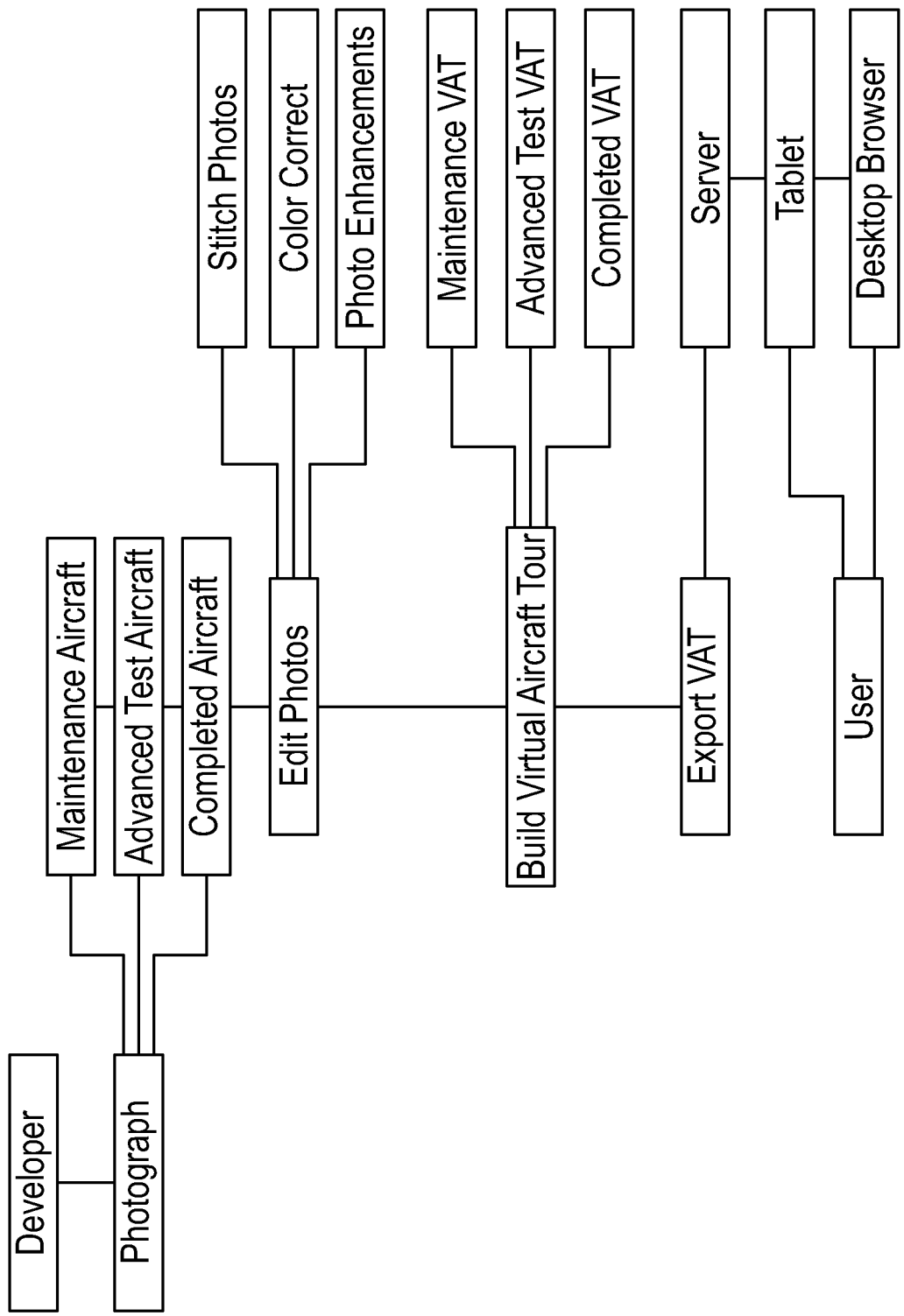
FIG. 5 depicts a flowchart of a virtual aircraft creation process.
Figure 6:
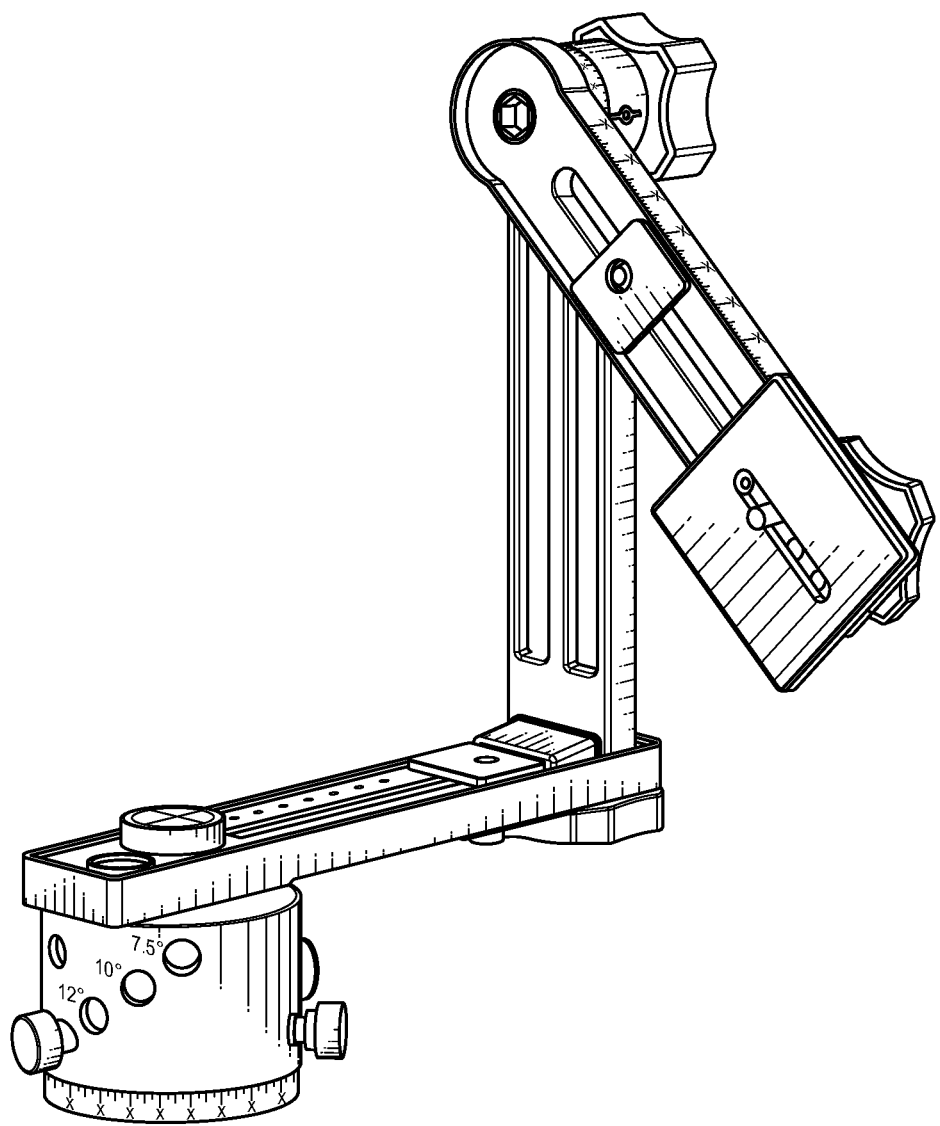
FIG. 6 depicts a schemati view of a digital camera with a tripod and panoramic head.

FIG. 4 depicts a completed aircraft view at 400. The completed aircraft view shows the aircraft with its interior entirely in place FIG. 5 depicts a virtual aircraft creation flowchart at 500. The process shows in the flowchart begins by photographing the aircraft while it is being built. The process to take the pictures is as follows. A digital camera with a tripod and panoramic head is used. An example of this equipment is shown at 600 in FIG. 6.

The camera is set at a height and location suitable for each aircraft and aircraft build state. In this example, 8-10 photos are taken for each location. The number of locations to be captured is dependent on aircraft. The photos are transferred and editing begins.

For the maintenance view state, photos are taken that show aircraft's structure, wire runs, and components. At a later time (e.g., a couple of weeks later), the aircraft is photographed when it is in the advanced test state in order to capture the advanced test view. The advanced test view shows the additional wire runs and structure build up. When the aircraft build process is completed, photographs are taken for the final aircraft view which shows the aircraft with its interior entirely in place. The camera is set up in the same position for each aircraft. It should be understood that other build states can be captured too based upon the situation at hand.

After the photos have been captured, The photos are color corrected, stitched and edited. The photos are imported into software called Panotour Pro by Kolor/GoPro and the process begins to build a virtual aircraft tour (VAT) at this point. Each photo is layered on top of each other allowing users to view the aircraft in the three defined build states from the same location. This brings the entire aircraft into the classroom or gives to customers the ability to provide training, familiarization and component location.

The virtual aircraft system is then published and uploaded to a server to where the customer may view the aircraft through a browser or other type of display.

While at least one example embodiment has been presented in the foregoing detailed description, it should be appreciated that a vast number of variations exist. It should also be appreciated that the embodiment or embodiments are only examples, and are not intended to limit the scope, applicability, or configuration of the disclosure in any way. Rather, the foregoing detailed description will provide those of ordinary skill in the art with a convenient road map for implementing the example embodiment or embodiments. It should be understood that various changes can be made in the function and arrangement of elements without departing from the scope of the disclosure as set forth in the appended claims and the legal equivalents thereof.

Additionally, the systems' and methods' data (e.g., associations, mappings, data input, data output, intermediate data results, final data results, etc.) may be stored and implemented in one or more different types of computer-implemented data stores, such as different types of storage devices (e.g., memory) and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

Still further, the systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

What is claimed is:

1. A computer-implemented method for displaying multiple aircraft build states of an aircraft build process, said method comprising:
   storing, in a computer storage device, visual depictions of the multiple aircraft build states that are layered over one another during the aircraft build process;
   wherein the multiple aircraft build states of an aircraft represent different operational states of the aircraft over time during the aircraft build process;
   wherein the visual depictions are associated with operational state data to indicate operational phases to which the visual depictions of the multiple aircraft build states are related, wherein the operational phases include a maintenance phase, a test phase, and a completed aircraft phase; and
   providing, by one or more data processors, a user interface for display to a user; wherein the user interface is configurable to display the multiple aircraft build states as layers that correspond to a chronological order of each aircraft state of the multiple aircraft build states during the aircraft build process;
   manipulating, by the user, the user interface to switch from displaying a visual photographic depiction of a substantially entire interior aircraft in the maintenance phase to displaying a visual photographic depiction of a substantially entire interior aircraft in the test phase; and
   manipulating, by the user, the user interface to switch from displaying the visual photographic depiction of a substantially entire interior aircraft in the test phase to displaying a visual photographic depiction of a substantially entire interior aircraft in the completed aircraft phase.

2. The method of claim 1 further comprising:
   manipulating the user interface to switch from displaying the visual photographic depiction of the substantially entire interior aircraft in the completed aircraft phase to displaying a visual photographic depiction of a substantially entire interior aircraft in the test aircraft phase;
   wherein views of the aircraft states include a maintenance view, a testing view, and a completed aircraft view.

3. The method of claim 2, wherein the maintenance view depicts structure, wire runs, and components of the aircraft; wherein the testing view depicts additional wire runs and structure build up; wherein the completed aircraft view depicts interior of the aircraft with all or substantially all of the interior in place.

4. The method of claim 1, wherein the layers are constructed of photographs of each of the aircraft states; wherein a camera is set in the same position for each aircraft across the aircraft build states.

5. The method of claim 4, wherein the photographs are stitched together to form a panoramic 360 degree view of an aircraft state.

6. The method of claim 1, wherein regions of the visual depictions are associated with callouts to provide information about an aircraft component for a particular aircraft state.

7. The method of claim 1, wherein the user interface is configurable to display the multiple aircraft build states in a chronological order for viewing by users learning about building aircrafts.

8. The method of claim 1, wherein the user interface is configurable to display the multiple aircraft build states in an order requested through user input.

9. The method of claim 1, wherein the user interface is displayed on a tablet or desktop browser.

10. The method of claim 1, wherein a computer database stores associations between the visual depictions and the operational state data.

11. A system for displaying multiple aircraft build states of an aircraft build process, said system comprising:
    at least one processor; and
    a non-transitory computer storage device storing instructions that, when executed by the at least one processor, cause the system to perform:
    storing, in the non-transitory computer storage device, visual depictions of the multiple aircraft build states that are layered over one another during the aircraft build process;
    wherein the multiple aircraft build states of an aircraft represent different operational states of the aircraft over time during the aircraft build process;
    wherein the visual depictions are associated with operational state data to indicate operational phases to which the visual depictions of the multiple aircraft build states are related, wherein the operational phases include a maintenance phase, a test phase, and a completed aircraft phase; and
    providing, by one or more data processors, a user interface for display to a user;
    wherein the user interface displays the multiple aircraft build states as layers that correspond to a chronological order of each aircraft state of the multiple aircraft build states during the aircraft build process;

manipulating, by the user, the user interface to switch from displaying a visual photographic depiction of a substantially entire interior aircraft in the maintenance phase to displaying a visual photographic depiction of a substantially entire interior aircraft in the test phase; and manipulating, by the user, the user interface to switch from displaying the visual photographic depiction of a substantially entire interior aircraft in the test phase to displaying a visual photographic depiction of a substantially entire interior aircraft in the completed aircraft phase.

12. The system of claim 11, wherein manipulating the user interface causes a switch from displaying the visual photographic depiction of the substantially entire interior aircraft in the completed aircraft phase to displaying a visual photographic depiction of a substantially entire interior aircraft in the test aircraft phase;

wherein views of the aircraft states include a maintenance view, a testing view, and a completed aircraft view.

13. The system of claim 12, wherein the maintenance view depicts structure, wire runs, and components of the aircraft; wherein the testing view depicts additional wire runs and structure build up; wherein the completed aircraft view depicts interior of the aircraft with all or substantially all of the interior in place.

14. The system of claim 11, wherein the layers are constructed of photographs of each of the aircraft states; wherein a camera is set in the same position for each aircraft across the aircraft build states.

15. The system of claim 14, wherein the photographs are stitched together to form a panoramic 360 degree view of an aircraft state.

16. The system of claim 11, wherein regions of the visual depictions are associated with callouts to provide information about an aircraft component for a particular aircraft state.

17. The system of claim 11, wherein the user interface is configurable to display the multiple aircraft build states in a chronological order for viewing by users learning about building aircrafts.

18. The system of claim 11, wherein the user interface is configurable to display the multiple aircraft build states in an order requested through user input.

19. The system of claim 11, wherein the user interface is displayed on a tablet or desktop browser; wherein a computer database stores associations between the visual depictions and the operational state data.

20. A non-transient computer readable storage media comprising computer instructions for displaying multiple aircraft build states of an aircraft build process, said computer instructions configurable to be executed by a hardware processor to:

store, in a computer storage device, visual depictions of the multiple aircraft build states that are layered over one another during the aircraft build process;

wherein the multiple aircraft build states of an aircraft represent different operational states of the aircraft over time during the aircraft build process:

wherein the visual depictions are associated with operational state data to indicate operational phases to which the visual depictions of the multiple aircraft build states are related, wherein the operational phases include a maintenance phase, a test phase, and a completed aircraft phase; and provide, by one or more data processors, a user interface for display to a user;

wherein the user interface is configurable to display the multiple aircraft build states as layers that correspond to a chronological order of each aircraft state of the multiple aircraft build states during the aircraft build process;

manipulate, by the user, the user interlace to switch from displaying a visual photographic depiction of a substantially entire interior aircraft in the maintenance phase to displaying a visual photographic depiction of a substantially entire interior aircraft in the test phase; and manipulate, by the user, the user interlace to switch from displaying the visual photographic depiction of a substantially entire interior aircraft in the test phase to displaying a visual photographic depiction of a substantially entire interior aircraft in the completed aircraft phase.

\* \* \* \* \*